(12) United States Patent
Schliwa-Bertling et al.

(10) Patent No.: US 11,412,473 B2
(45) Date of Patent: Aug. 9, 2022

(54) PDU SESSION MANAGEMENT

(71) Applicant: TELEFONAKTIEBOLAGET LM ERICSSON (PUBL), Stockholm (SE)

(72) Inventors: Paul Schliwa-Bertling, Ljungsbro (SE); Stefan Rommer, Västra Frölunda (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 6 days.

(21) Appl. No.: 15/744,238

(22) PCT Filed: Dec. 15, 2017

(86) PCT No.: PCT/SE2017/051281
§ 371 (c)(1),
(2) Date: Jan. 12, 2018

(87) PCT Pub. No.: WO2018/132050
PCT Pub. Date: Jul. 19, 2018

(65) Prior Publication Data
US 2019/0007921 A1 Jan. 3, 2019

Related U.S. Application Data

(60) Provisional application No. 62/444,565, filed on Jan. 10, 2017.

(51) Int. Cl.
*H04W 60/00* (2009.01)
*H04W 76/10* (2018.01)
*H04W 76/25* (2018.01)

(52) U.S. Cl.
CPC ........... *H04W 60/00* (2013.01); *H04W 76/10* (2018.02); *H04W 76/25* (2018.02)

(58) Field of Classification Search
CPC ..... H04W 60/00; H04W 76/25; H04W 76/10; H04W 72/0413; H04W 76/20; H04W 80/10
See application file for complete search history.

(56) References Cited

U.S. PATENT DOCUMENTS

| | | | |
|---|---|---|---|
| 2002/0086670 A1* | 7/2002 | Rajaniemi | H04W 76/25 455/560 |
| 2008/0070574 A1* | 3/2008 | Vikberg | H04W 36/00837 455/435.2 |

(Continued)

FOREIGN PATENT DOCUMENTS

| | | |
|---|---|---|
| JP | 2003503987 A | 1/2003 |
| KR | 1020150074138 A | 7/2015 |

(Continued)

OTHER PUBLICATIONS

3rd Generation Partnership Project; Technical Specification Group Services and System Aspects; Study on Architecture for Next Generation System (Release 14); 2016.*

(Continued)

*Primary Examiner* — Dinh Nguyen
(74) *Attorney, Agent, or Firm* — Rothwell, Figg, Ernst & Manbeck, P.C.

(57) ABSTRACT

The present invention relates to PDU session management and in particular methods and devices for establishing user plane resources for PDU sessions. This is realized in a number of embodiments such as methods and devices for an infrastructure node and user equipment node. For instance in a method for Protocol Data Unit, PDU, session management, with steps of receiving, at an Access and Mobility Management function entity, AMF, a registration request message transmitted by a user equipment, UE, wherein the registration request message comprises information indicating that one or more PDU sessions require user plane, UP, (Continued)

resources and identifying each of the PDU sessions that require UP resources, and in response to receiving the registration request message, the AMF transmitting to a session management function, SMF, a UP resource request message for requesting the SMF to establish UP resources for at least one of the PDU sessions that requires UP resources. The method may further comprise in response to receiving the UP resource request message, the SMF triggers a UP function relocation.

27 Claims, 11 Drawing Sheets

(56) References Cited

U.S. PATENT DOCUMENTS

| 2012/0289181 | A1* | 11/2012 | Bourdu | H04W 4/44 455/404.1 |
|---|---|---|---|---|
| 2018/0199398 | A1* | 7/2018 | Dao | H04W 36/14 |

FOREIGN PATENT DOCUMENTS

| KR | 1020160120364 A | 10/2016 |
|---|---|---|
| WO | 2012/154308 A1 | 11/2012 |

OTHER PUBLICATIONS

International Search Report and Written Opinion issued in Application No. PCT/SE2017/051281 dated Apr. 23, 2018, 12 pages.

Ericsson, "Registration procedure", 3GPP SA WG2 Temporary Document, Meeting #118-BIS, S2-16xxxx, Spokane, WA, USA, Jan. 16-20, 2017, 6 pages.
Ericsson, Nokia, Alcatel-Lucent Shanghai Bell, "23.502: PDU Session Establishment procedure", 3GPP SA WG2 Temporary Document, Meeting #118-BIS, S2-16xxxx, Spokane, WA, USA, Jan. 16-20, 2017, 8 pages.
CATT, "Common interface for MM and SM function", 3GPP SA WG2 Temporary Document, Meeting #116, S2-163944, Vienna, Austria, Jul. 11-15, 2016, 3 pages.
Qualcomm Inc., "Further agreements on Key Issue 4 for selective re-establishment of user plane resources", 3GPP SA WG2 Temporary Document, Meeting #118, S2-166542, Reno, NV, USA, Nov. 14-18, 2016, 5 pages.
Ericsson, "Alignment and correction of terminologies for PDU Session Establishment/Release and User Plane Activation /Deactivation", 3GPP SA WG2 Temporary Document, Meeting #122bis, S2-166423, Sophia Antipolis, France, Aug. 21-25, 2017, 30 pages.
3GPP TS 23.799 v1.1.0, 3rd Generation Partnership Project; Technical Specification Group Services and System Aspects; Study on Architecture for Next Generation System (Release 14) (Oct. 2016), 503 pages.
3GPP TR 23.799 V14.0.0 (Dec. 2016), 3rd Generation Partnership Project; Technical Specification Group Services and System Aspects; Study on Architecture for Next Generation System (Release 14), Dec. 2016 (522 pages).
Ericsson et al., "23.502: PDU Session Establishment procedure", SA WG2 Meeting #11BIS, S2-170140, Spokane, WA, USA, Jan. 16-20, 2017 (7 pages).
Ericsson, "Registration procedure", SA WG2 Meeting #118BIS, S2-170126, Spokane, WA, USA, Jan. 16-20, 2017 (6 pages).
HTC, "indication of pending signalling during registration procedure", SA WG2 Meeting #S2-122, S2-174342, San Jose Del Cabo, Mexico, Jun. 26-30, 2017 (6 pages).

* cited by examiner

PDU SESSION MANAGEMENT

TECHNICAL FIELD

The present invention relates to PDU session management and in particular to establishing user plane resources for PDU sessions.

BACKGROUND

In the telecommunications arena, there is a constant evolution ongoing in order to provide efficient and reliable solutions for utilizing wireless communication networks. Each new generation has it owns technical challenges for handling the different situations and processes that is needed to connect and service devices connected to the wireless network. This is especially true for cellular telecommunications networks.

Cellular telecommunication networks comprise on a high level an access infrastructure and a core infrastructure. The access infrastructure provides radio access for connecting devices and handles the connectivity of these devices. The core infrastructure provide authentication, billing, quality of service (QoS) handling, and similar user/device management features. Furthermore, the core network also provides access to external networks such as for instance Internet access. It should be noted that the connecting devices are often denoted user equipment UE but the devices do not necessarily need a user but can be any type of device connecting to the network, i.e., a device capable of wireless communication with a radio access network node, the UE may for example be a smartphone, laptop, PC, utility device, vehicle, a smart sensor, etc. With the advent of Internet of Things (IoT) many different types of devices, functions and solutions are being rolled out that involve human interaction or as standalone devices serving different solutions or functions.

The Third Generation Partnership Project (3GPP) has begun work on the development and design of the next generation mobile communications system (a.k.a., the 5G mobile communication system or the Next Generation (NG) system or simply "5G" or "NG" for short). 3GPP is currently in the process of specifying the 5G radio interface called New Radio (NR) or "G-UTRA" as well as a Next Generation Packet Core Network (NG-CN or NGC).

A user equipment (UE) needs to register with a network in order to receive services which require registration. A registration procedure is utilized in the following situations: (1) when the UE initially registers to a 5G system; (2) when the UE initiates a registration procedure due to mobility, e.g. when the UE changes to a new Tracking Area (TA) in idle mode; (3) when the UE performs a periodic update due to expiration of a predefined time period of inactivity, etc.

During an initial registration a Mobile Equipment (ME) Identity is obtained from the UE. An Access and Mobility Management function (AMF) operator may check the ME Identity with an EIR. The AMF then passes the ME Identity (IMEISV) to a Unified Data Management (UDM), a Session Management function (SMF) and a Policy Control function (PCF). The AMF is also known as the Mobility Management function (MMF), accordingly the AMF and the MMF are equivalent.

SUMMARY

At registration of a user equipment, UE, to a 5G Core Network (CN) it is not possible for the access and mobility management function, AMF, to know to setup or initiate user plane (UP) resources required for a particular Protocol Data Unit, PDU, session in which the UE has UP data to transmit. This disclosure addresses this issue.

For example, in one embodiment, the UE includes information in a registration request message (e.g. Attach Request message, Tracking Area Update (TAU), Registration Request, or similar) regarding which PDU session(s) require(s) UP resources (e.g. Data Radio Bearers (DBRs) on a radio interface and related UP tunnels between network functions in the network). The AMF receives the registration request message transmitted by the UE which includes the information regarding which PDU session(s) requires the UP resources. The AMF requests the establishment of the UP resources, in accordance with the information regarding which PDU session(s) requires the UP resources in the registration request message transmitted by the UE. In response to the request for the establishment of the UP resources, a Radio Access Network (RAN) and SMF(s) allocate the UP resources accordingly.

The present invention is realized in a number of embodiments, for instance in a method for Protocol Data Unit, PDU, session management, with steps of receiving, at an Access and Mobility Management function entity, AMF, a registration request message transmitted by a user equipment, UE, wherein the registration request message comprises information indicating that one or more PDU sessions require user plane, UP, resources and identifying each of the PDU sessions that require UP resources, and in response to receiving the registration request message, the AMF transmitting to a session management function, SMF, a UP resource request message for requesting the SMF to establish UP resources for at least one of the PDU sessions that requires UP resources. The method may further comprise in response to receiving the UP resource request message, the SMF triggers a UP function relocation.

Furthermore, the registration request message may comprise a registration type identifier (ID) indicating that the UE is in a registered state and is initiating a registration due to mobility. The method may further comprise steps of receiving session management, SM, information transmitted by the SMF in response to the UP resource request message, wherein the SM information is N2 SM information, the AMF transmitting to an access node serving the UE an N2 PDU Session Request message, wherein the message includes the session management information. Wherein, the N2 SM information comprises information indicating a quality of service (QoS) and tunnel endpoint information.

The UP resources for an identified PDU session that requires UP resources may include data radio bearers, DRBs, on a radio interface and a UP tunnel between a UP function and the access node serving the UE. The registration request message comprises a follow-on flag indicating that the UE is requesting that the network maintain a signaling connection with the UE. The method may further comprise steps of the AMF storing information (e.g., a local flag) indicating that the UE has requested that the signaling connection be maintained, and the AMF sending information to a node of a radio access network (RAN) that is serving the UE, wherein the information sent to the node indicates that the UE has requested that the signaling connection be maintained.

In another embodiment, an Access and Mobility Management function entity, AMF, is provided for Protocol Data Unit, PDU, session management, the AMF comprising a data processing system, a data storage system, and a network interface, wherein the data processing system is adapted to execute computer readable instructions stored in the data storage system, to receive via the network interface a registration request message transmitted by a user equipment, UE, wherein the registration request message comprises information indicating that one or more PDU sessions require user plane, UP, resources and identifying each of the PDU sessions that require UP resources; and in response to receiving the registration request message, transmit via the network interface to a session management function, SMF, a UP resource request message for requesting the SMF to establish UP resources for at least one of the identified PDU sessions that requires UP resources.

Yet another embodiment, a method, in a user equipment, UE, is provided for protocol data unit, PDU, session management, the method comprising determining, by a user equipment, UE, that one or more PDU sessions requires user plane, UP, resources, determining, by the UE, that a registration request message needs to be transmitted, and after determining that a) the registration request message needs to be transmitted and b) the one or more PDU sessions requires UP resources, the UE transmitting the registration request message, wherein the registration request message comprises information indicating that the one or more PDU session requires UP resources.

In the method of the UE the registration request message may further comprise a registration type identifier, ID, for identifying a registration type, a UE ID, security parameters, network slice selection assistance information, and Network Slice Selection Assistance Information, NSSAI. The registration request message may further comprise a registration type identifier indicating that the UE is in a registered state and is initiating a registration due to mobility. The UP resources for the identified PDU session include data radio bearers, DRBs, on a radio interface and an UP tunnel.

The registration request message may further comprise a follow-on flag indicating that the UE is requesting that the network maintain a signaling connection with the UE.

Still another embodiment is provided, a user equipment, UE, comprising a data processing system, a data storage system, a radio transmitter and receiver coupled to an antenna, where the data processing system is adapted to execute computer readable instructions for determine that a one or more protocol data unit, PDU, sessions requires user plane, UP, resources, determine that a registration request message needs to be transmitted using the radio transmitter, and after determining that a) the registration request message needs to be transmitted and b) the one or more PDU session requires UP resources, transmit using the radio transmitter the registration request message, wherein the registration request message comprises information indicating that the one or more PDU sessions requires UP resources.

An advantage provided by embodiments disclosed herein is that the network can configure the UP resources to enable the transfer of UP data for PDU session(s) indicated in a registration request message transmitted by a UE.

BRIEF DESCRIPTION OF THE DRAWINGS

The accompanying drawings, which are incorporated herein and form part of the specification, illustrate various embodiments.

DETAILED DESCRIPTION

Figure 1:
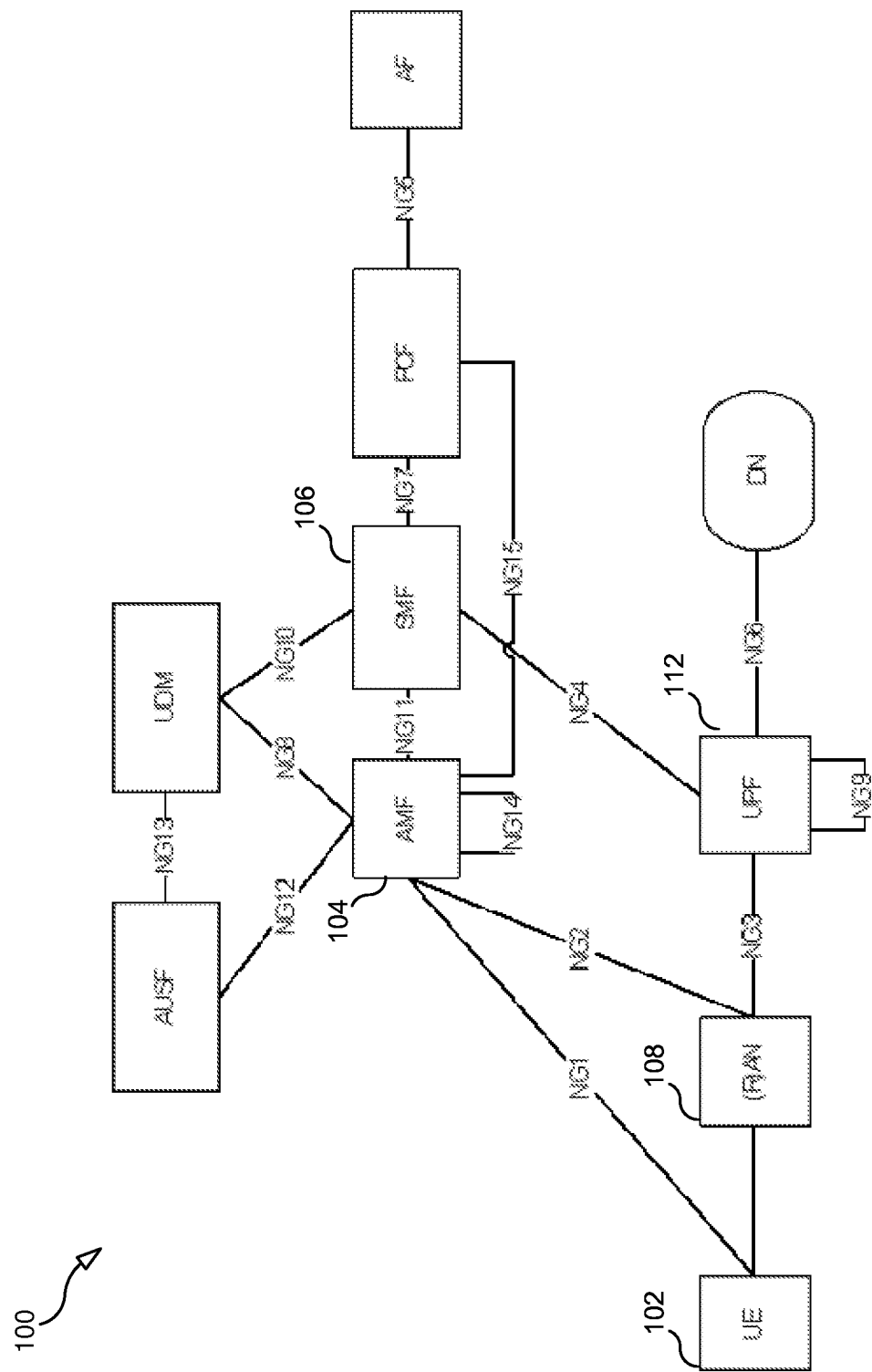
FIG. 1 illustrates an exemplary Next Generation communication structure.

As mentioned above, user equipment (UE) 102 needs to register with the network to receive services that require registration. Referring now to FIG. 1, FIG. 1 illustrates an exemplary 5G communication system 100. The 5G communication system 100 illustrates a point to point reference point representation. In FIG. 1 some nodes and functions of the network are shown. A user equipment (UE) 102 connects to the network via a radio access network node (RAN) 108. The RAN may be a for instance a base station, NodeB, or an eNodeB. It should be noted that the UE may be a mobile phone, for instance a smart phone, or some other type of unit with wireless communication capabilities, such as Internet of Thing (IoT) devices, Machine-to-machine devices, vehicles, sensors, computers, laptops, and so on. The RAN 108 is in turn connected to a core network comprising a User Plane function (UPF) 112, an Access and Mobility Management function (AMF) 104, a Session Management function (SMF) 106, a Policy Control function (PCF) 120. Furthermore, the network may comprise an Authentication Server Function/AUSF) 121, a Unified Data Management node (UDM) 122, an application function (AF) 123, and connecting to an external data network (DN) 124. These nodes/functions are interconnected with different interfaces NG1-NG15 as shown in FIG. 1, it should be noted that interfaces may also be denoted with N1 to N15.

It should be noted that all nodes and functions may be physically located as separate nodes or partly incorporated into different nodes together with other nodes/functions but for illustrative purposes shown as separate entities.

The registration procedure is utilized in the following situations: (1) when the UE 102 initially registers to a 5G system; (2) when the UE 102 initiates a registration procedure due to mobility, e.g. when the UE 102 changes to a new registration area (e.g. a new Tracking Area (TA)) in idle mode; (3) when the UE 102 performs a periodic update due to expiration of a predefined time period of inactivity, etc.

During an initial registration a Mobile Equipment (ME) Identity is obtained from the UE 102. An Access and Mobility Management function (AMF) 104 operator may check the ME Identity with an DR. The AMF 104 then passes the ME Identity (IMEISV) to a Unified Data Management (UDM), a Session Management function (SMF) 106 and a Policy Control function (PCF).

Figure 2:
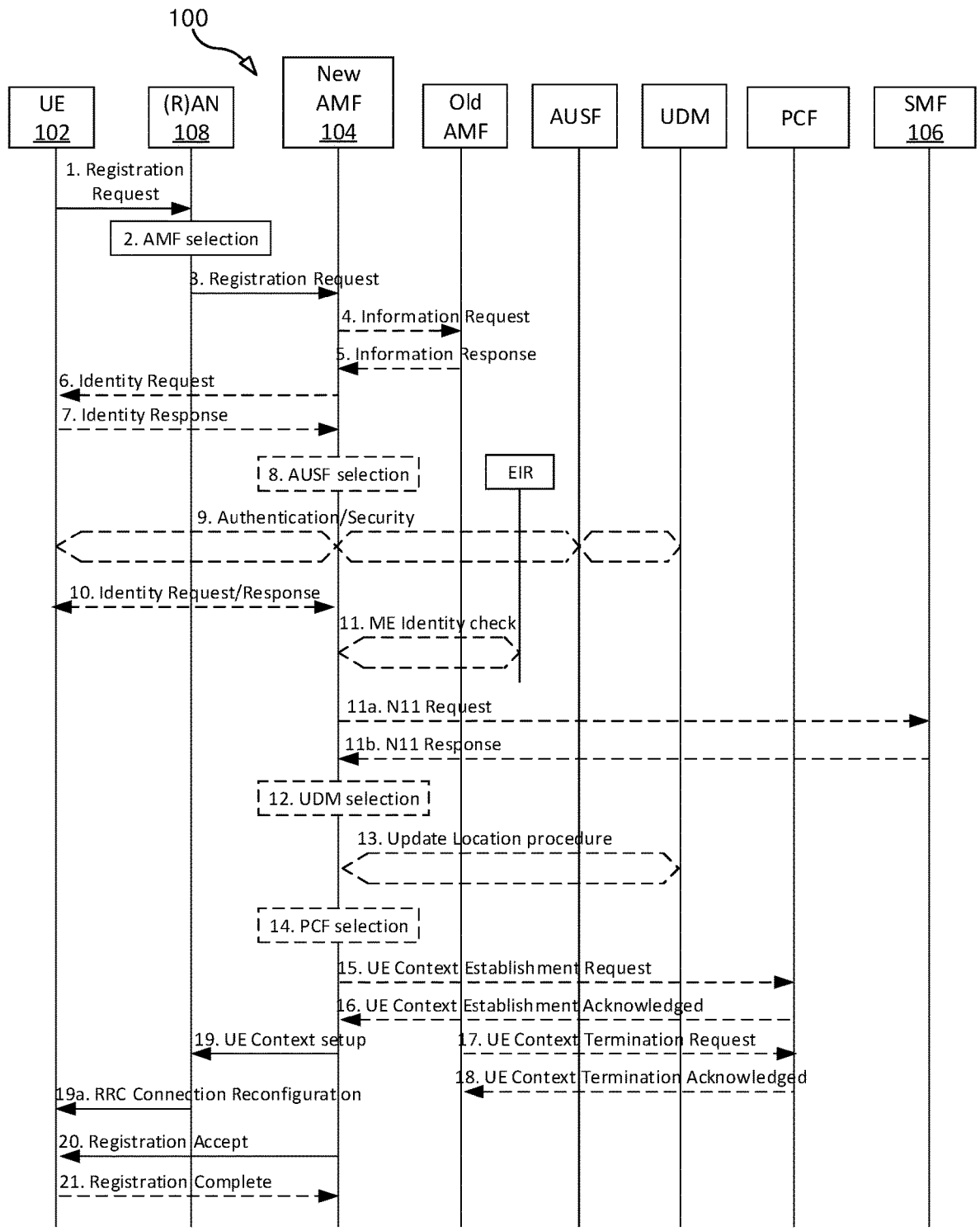
FIG. 2 is a message flow diagram illustrating a process according to one embodiment.

FIG. 2 is a message flow diagram illustrating a UE registration process 200, according to one embodiment.

In step 1, the UE 102 transmits a registration request message to the RAN 108. In an embodiment, the registration request message may comprise: a registration type identifier (ID) for identifying a registration type, a UE ID (e.g., a Permanent ID or a Temporary ID), security parameters, network slice selection assistance information (NSSAI), UE 5GCN Capability information, PDU session status information, and Radio Resource Control (RRC) parameters indicating Permanent ID or the Temporary ID, the Selected Network and NSSAI. The registration type ID indicates whether the UE 102 wants to perform an "initial registration" (i.e. the UE 102 is in non-registered state), a "mobility registration" (i.e. the UE 102 is in registered state and initiates a registration due to mobility) or a "periodic registration" (i.e. the UE 102 is in registered state and initiates a registration due to the periodic update timer expired).

Advantageously, the registration request message may further include information identifying one or more Protocol Data Unit (PDU) sessions that require user plane (UP) resources, such as Data Radio Bearer(s) and tunnels between the UP function (UPF) and RAN. In one embodiment, the UE 102 marks the PDU session(s) which requires the establishment of UP resources with an Active flag in the registration request message. In some embodiments, the marked PDU session(s) require the establishment of the UP resources because the UE 102 has UP data to transmit to the network. For example, the registration request message may include a first ordered set of N bits (i.e., a "bitmap"), where each one of the N bits corresponds to a different one of N possible PDU sessions that could require UP resources (e.g., the first bit in the string corresponds to a first PDU session, the second bit in the string corresponds to a second PDU session, etc.). In some embodiments, N is equal to the total number of PDU sessions that are deemed active by the UE (e.g., N=3), whereas in other embodiments N is equal to the total number of possible active PDU sessions in the UE (e.g., N=16). The value of each bit in the bit string indicates whether the PDU session corresponding to the bit requires UP resources (e.g. if bit n is set to a value of 1, then the PDU session corresponding to this bit requires UP resources, but if the bit n is set to a value of 0, then the corresponding PDU session does not require UP resources). In this way, the UE can signal to the network the identity of the PDU session that require UP resources.

Further, the registration request message may also include information (e.g. a flag) indicating that the UE 102 is requesting "Follow-On"—that is, the UE is requesting the network to maintain the signaling connection with the UE after the registration procedure is completed because, for example, the UE has additional messages (e.g., a PDU session establishment message) to send to the network.

In step 2, if the registration request message includes an ID (Permanent or Temporary) that does not indicate a valid AMF, the RAN 108 selects an AMF 104 based on Radio Access Technology (RAT) and NSSAI, if available.

In step 3, the RAN 108 transmits the registration request message to the AMF 104. In an embodiment, the registration request message transmitted to the AMF 104 further comprises: Location Information, Cell Identity, and RAT type. The Location Information, Cell Identity and RAT type relates to the cell in which the UE is located.

In step 4, if the registration request message includes the UE's Temporary ID and the serving AMF 104 has changed since the last registration, the AMF 104 may transmit an Information Request to the old AMF. The Information Request includes the complete registration request message IE in order to request the UE's Permanent ID and Mobility Management (MM) Context.

In step 5, in response to the Information Request transmitted by the AMF 104, the old AMF responds with an Information Response. The Information Response comprises the Permanent ID, the MM Context, and the SMF information. In some embodiments, the old AMF has stored information regarding active PDU sessions. If the old AMF has stored information about active PDU sessions, the old AMF includes SMF information comprising SMF identities and corresponding PDU session identities in the Information Response so that the AMF 104 can map PDU sessions to SMFs.

In step 6, if the Permanent ID is not provided by the UE 102 nor retrieved from the old AMF in the Information Response, an Identity Request procedure is initiated by the AMF 104 transmitting an Identity Request message to the UE 102.

In step 7, in response to the Identity Request message, the UE 102 responds to the AMF 104 with an Identity Response message including the Permanent ID.

In step 8, the AMF 104 selects an AUSF if the registration request message is not sent with integrity protection or the integrity protection is indicated as failed based on the Permanent ID contained in the Information Response (step 5).

In step 9, if the AMF 104 selects the AUSF because the registration request message is not sent with integrity protection or the integrity protection is indicated as failed, the AUSF initiates authentication of the UE 102 and NAS security functions. Once security for the registration request message is established, the AMF 104 may fetch IMEI from the UE 102.

In step 10, the AMF 104 transmits an Identity Request to the UE 102 to retrieve the UE's ME identity if the ME identity is not provided by the UE 102 in the registration request message nor retrieved from the old AMF in the Information Response.

In step 11, in some embodiments, the AMF initiates an ME identity check.

In step 11a, the AMF 104 sends a request (e.g., N11 Request) to SMF 106. If the AMF 104 is changed, the AMF 104 notifies each SMF 106 of the new AMF 104 serving the UE 102 (i.e., the AMF 104 sends the request to each SMF). The new AMF 104 verifies the PDU session status received from the UE 102 with the SMF information received from the old AMF. If the AMF 104 has not changed, the AMF 104 verifies the PDU session status received from the UE 102 with the available SMF information. After the AMF 104 determines the active PDU sessions in the UE 102, the AMF 104 releases any network resources related to PDU sessions that are not active in the UE 102.

Additionally, if the registration request message indicates that one or more PDU sessions require UP resources, then, for each such PDU session, the AMF 104 transmits to the SMF responsible for handling the PDU session a UP resource request for causing the SMF to establish UP resources for the PDU session. For example, if the registration request message indicates that a PDU session being handled by SMF 106 requires UP resources, the request sent to SMF 106 in step 11a will further includes the UP resource request.

In step 11b, in response to the UP resource request, the SMF 106 transmits a UP resource response (e.g., N11 Response). In some embodiments, the SMF 106 decides to trigger a UPF relocation. In some embodiments, the SMF 106 provides the SM information (e.g., N2 SM information) in the UP resource response (e.g., N11 Response). The SM information may include quality-of-service (QoS) service information and tunnel endpoint information for establishing a tunnel between the radio access network (RAN) and UPF. In some embodiments, the SMF provides the SM information in the response only if the AMF specifically requested it in the request.

In step 12, in some embodiments, the AMF 104 selects a UDM based on the UE's 102 Permanent ID.

In step 13, the AMF 104 initiates an Update Location procedure if: (1) the AMF 104 has changed since the last registration; (2) there is no valid subscription context for the UE 102 in the AMF 104; or (3) the UE 102 provides a Permanent ID which does not refer to a valid context in the AMF 104. When the Update Location procedure is initiated, the UDM initiates Cancel Location to the old AMF, if available. In response to the Cancel Location, the old AMF removes the associated MM context and notifies all possibly associated SMF(s). In some embodiments, interactions between the UDM and the PCF includes mobility restriction related information.

In step 14, in some embodiments, the AMF 104 selects the PCF based on the UE's 102 Permanent ID.

In step 15, in some embodiments, the AMF 104 transmits a UE Context Establishment Request to the PCF to apply operator policies for the UE 102.

In step 16, the PCF responds to the UE Context Establishment Request with a UE Context Establishment Acknowledged to the AMF 104.

In step 17, in some embodiments, the old AMF transmits a UE Context Termination Request to the PCF.

In step 18, the PCF responds to the UE Context Termination Request with a UE Context Termination Acknowledged to the old AMF.

In step 19, the AMF 104 transmits a UE Context setup (Access Stratum (AS) Security Context information) to the RAN 108. If in step 11b the AMF receives the SM information from SMF 106, then this SM information and an N2 PDU Session Request (Quality of Service (QoS), tunnel information, etc.) is included in the UE Context setup.

The AMF 104 validates the UE's 102 presence in the (new) location and if all checks are successful and the UE marked a PDU session as requiring UP resources or requested Follow-On, then the connection is to be maintained and the AMF requests RAN to set up a secure connection to the UE by providing Access Stratum (AS) security context information in the UE Context Setup message sent to the RAN.

In some embodiments, the AMF 104 rejects the registration request message with an appropriate reject cause if the UE is not allowed to register in the current location.

In step 19a, if the UE Context setup request includes a PDU Session Request, the RAN 108 performs RRC Connection Reconfiguration with the UE 102 in order to establish the default radio bearer (DRB) for the PDU Session(s) request received in step 19.

In step 20, the AMF 104 sends a Registration Accept message to the UE 102 indicating that the registration request message has been accepted. In an embodiment, the Registration Accept message comprises: Temporary ID, Registration area. Mobility restrictions, and PDU session status. The AMF 104 indicates the PDU session status to the UE 102. Accordingly, the UE removes any internal resources related to PDU sessions that are not marked active in the received PDU session status. If the PDU session status information was in the registration request message, the AMF 104 indicates the corresponding PDU session status to the UE 102. In some embodiments, the Registration Accept message includes the Temporary ID if the AMF 104 allocates a new Temporary ID for the UE 102. In some embodiments, the Registration Accept message includes Mobility restrictions if mobility restrictions apply to the UE 102.

In step 21, in response to the Registration Accept message, the UE 102 transmits a Registration Complete message to the AMF 104. If a new Temporary ID is included in the Registration Accept message, the Registration Complete message acknowledges to the AMF 104 that the new Temporary ID is assigned.

Figure 3:
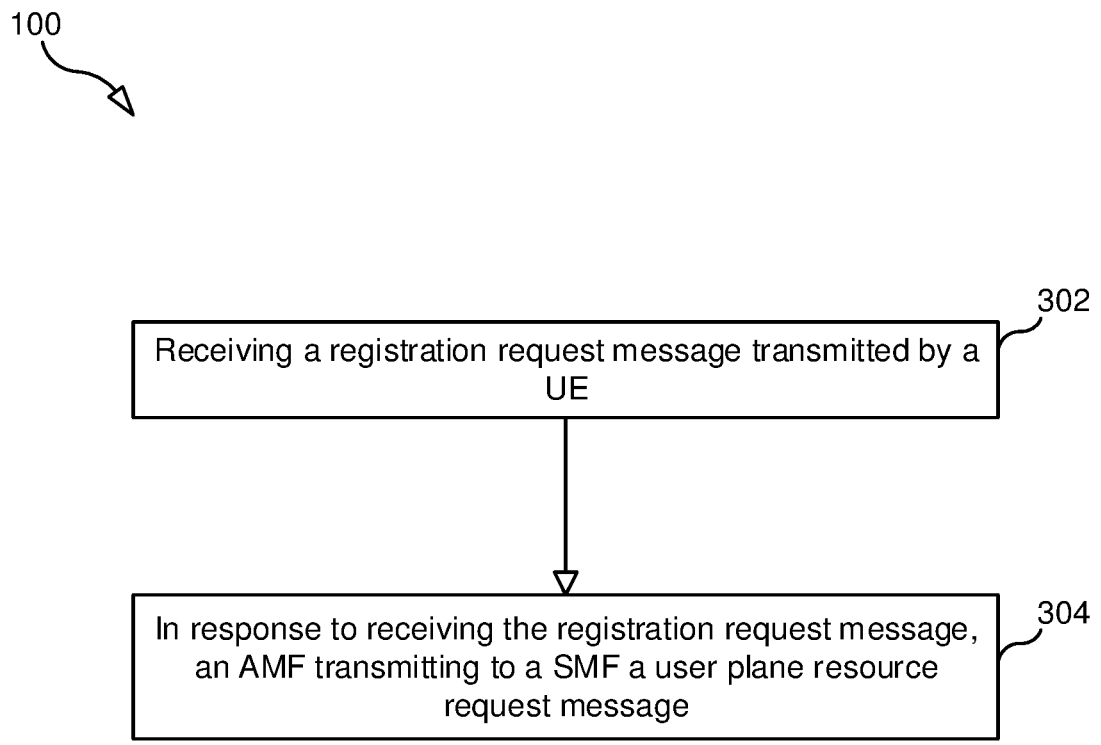
FIG. 3 is a flow chart illustrating a process according to one embodiment.

FIG. 3 is a flow chart illustrating a process 300, according to one embodiment, that is performed by the AMF 104 for PDU session management.

Process 300 may begin with step 302 in which the AMF 104 receives a registration request message transmitted by the UE 102, wherein the registration request message comprises information identifying a PDU session that requires UP resources.

In step 304, in response to receiving the registration request message, the AMF 104 transmits to the SMF 106, a UP resource request message for requesting the SMF 106 to establish UP resources for the identified PDU session.

In some embodiments, in response to receiving the UP resource request message, the SMF 106 triggers a UP function relocation.

In some embodiments, the AMF 104 further receives session management information (e.g., N2 SM information) transmitted by the SMF 106 in response to the UP resource request message.

In some embodiments, the AMF 104 transmits to an access node 108 serving the UE 102 a message (e.g., N2 PDU Session Request), wherein the message includes the session management information (e.g., N2 SM information).

In some embodiments, the session management information (e.g., N2 SM information) comprises information indicating a quality of service (QoS) and tunnel endpoint information.

In some embodiments, the UP resources for the identified PDU session include data radio bearers (DRBs) on a radio interface and UP tunnels between a UP function and the access node 108 serving the UE 102.

Figure 4:
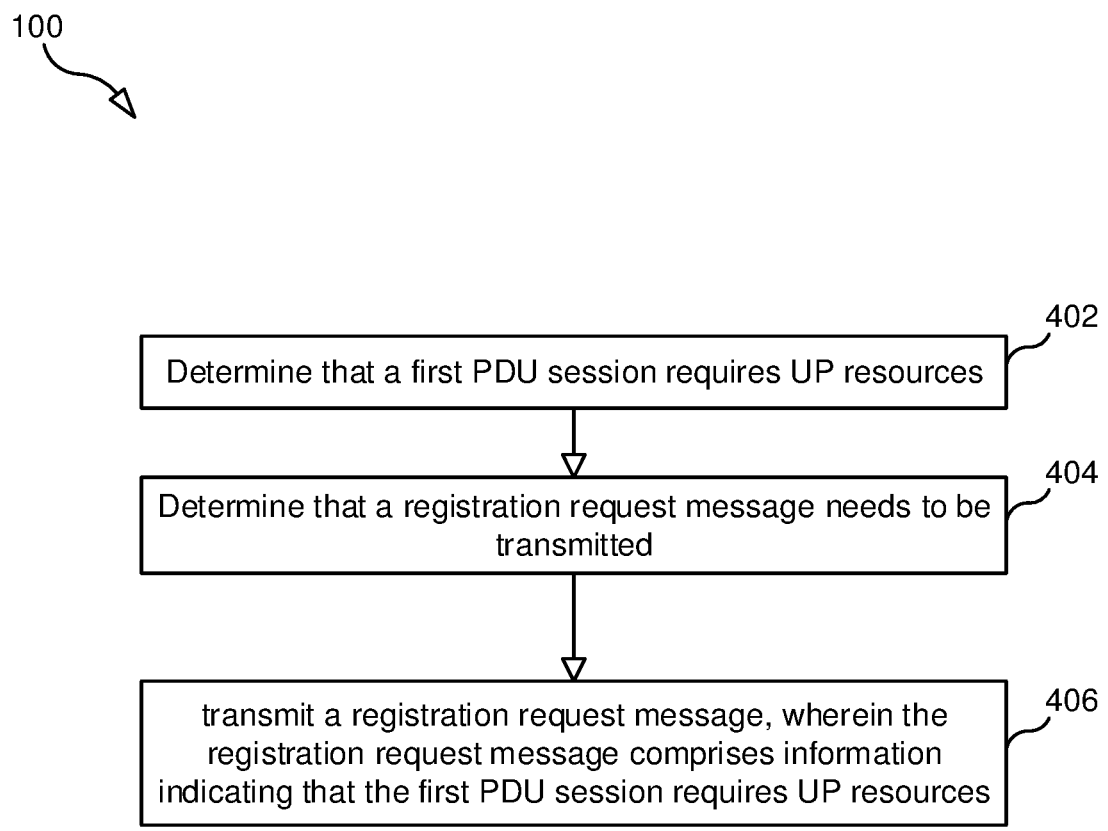
FIG. 4 is a flow chart illustrating a process according to one embodiment.

FIG. 4 is a flow chart illustrating a process 400, according to one embodiment, that is performed by the UE 102 for PDU session management.

Process 400 may begin with step 402 in which the UE 102 determines a first PDU session that requires UP resources.

In step 404, the UE determines that a registration request message needs to be transmitted (e.g., the UE determines that it needs to perform a mobility registration). In some embodiments, step 404 is performed as a result of the UE determining that the first PDU session requires UP resources. In other embodiments, step 404 is performed periodically (e.g., before step 402). In some embodiments, the step of the UE determining that a registration request message needs to be transmitted comprises the UE determining that the UE has moved into a new registration area (e.g., the UE has moved out of the registration area in which the UE previously registered).

In step 406, the UE 102 transmits a registration request message after determining that i) the first PDU session requires UP resources and ii) a registration request message needs to be transmitted. The registration request message comprises information indicating that the first PDU session requires UP resources.

In some embodiments, the UE may further determine that a second PDU session also requires UP resources and the registration request message transmitted in step 406 includes information indicating that both the first and the second PDU sessions require UP resources.

For example, in some embodiments, the UE performs a process 900 (see FIG. 9), which process includes: 1) the UE periodically determining whether it has moved into a new registration area (step 902) (i.e., determines that a registration request message needs to be sent) and, as a result of determining that it has moved into a new registration area, the UE generates a registration request message (step 904) and transmits the registration request message (step 906), wherein the step of generating the registration request message comprise the UE determining whether the UE has uplink (UL) data to send (step 904a) and, if that is the case, the UE includes in the registration request message information indicating that a PDU session requires UP resources and identifying said PDU session.

In some embodiments, the registration request message includes a registration type identifier. The registration type ID indicates one of the following: (1) the UE 102 is in a non-registered state and is requesting an initial registration; (2) the UE 102 is in a registered state and is initiating a registration due to mobility; and (3) the UE 102 is in the registered state and is initiating the registration due to expiration of a periodic update timer.

In some embodiments, the UP resources for the identified PDU session include data radio bearers (DRBs) on a radio interface and a UP tunnel between a UP function and an access node 108 serving the UE 102.

Figure 9:
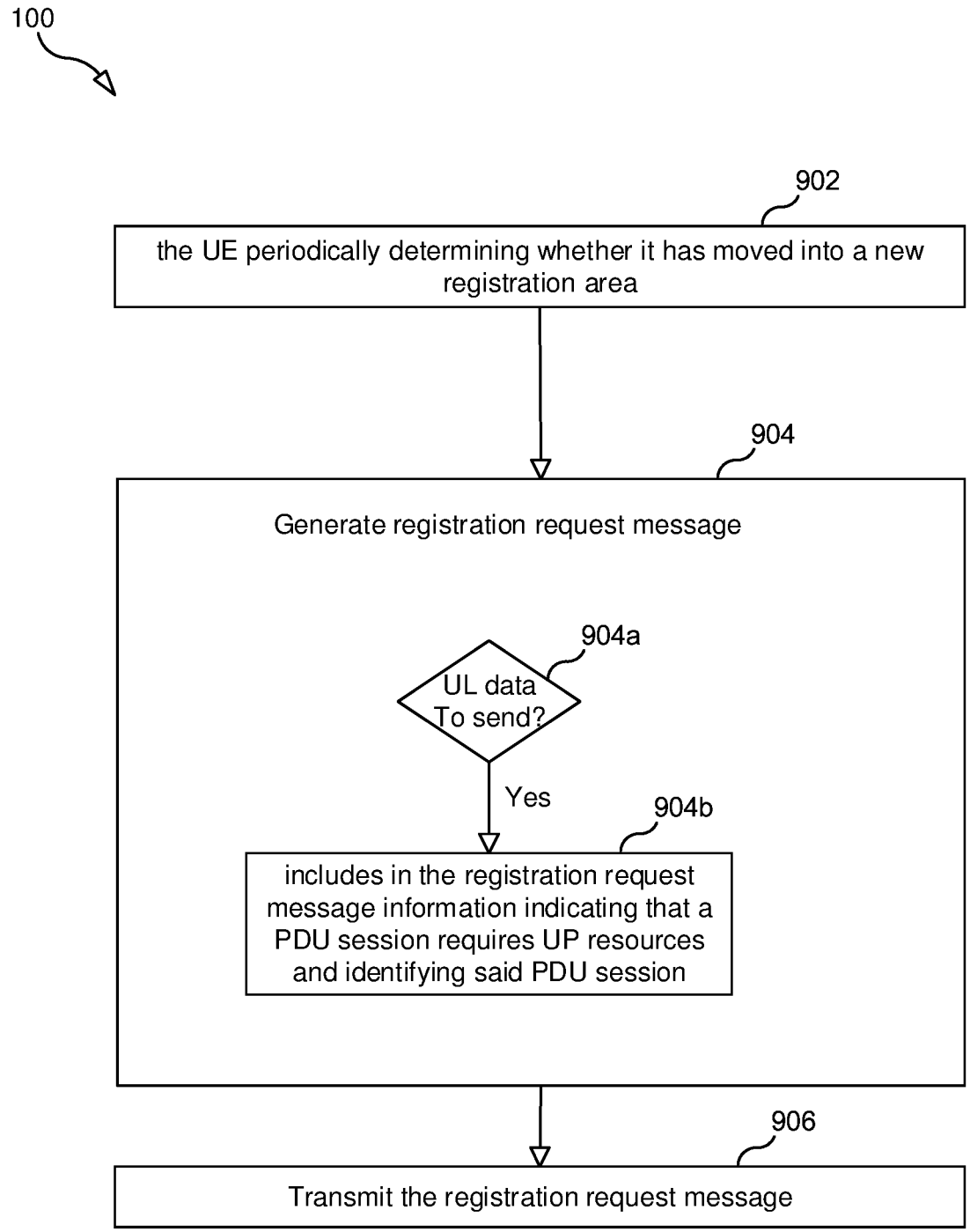
FIG. 9 is a flow chart illustrating a process according to one embodiment.

FIG. 9 is a flow chart illustrating a process 900 according to some embodiments.

G1. Process 900 includes: UE (102) determining whether the UE has moved into a new registration area (step 902); and as a result of determining that the UE has moved into a new registration area, the UE generating a registration request message (904) and transmitting the registration request message (906), wherein the step of generating the registration request message comprise: the UE determining whether the UE has uplink (UL) data to send (904a) and, if that is the case, the UE includes in the registration request message information i) indicating that a PDU session requires UP resources and ii) identifying said PDU session (904b).

Figure 10:
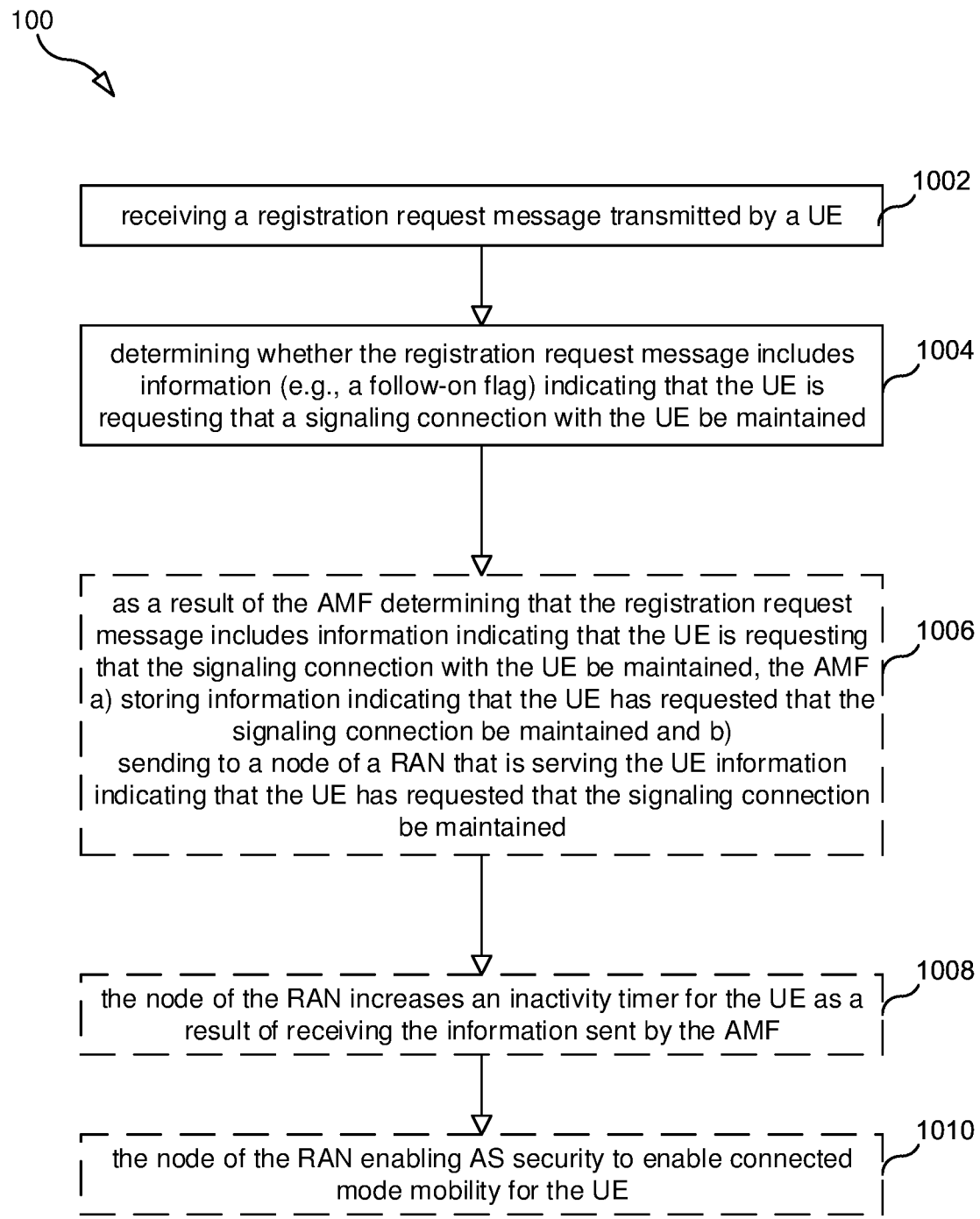
FIG. 10 is a flow chart illustrating a process according to one embodiment.

FIG. 10 is a flow chart illustrating a process 1000 according to some embodiments. Process 100 includes: AMF (104) receiving a registration request message transmitted by a UE (102); and the AMF (104) determining whether the registration request message includes information (e.g., a follow-on flag) indicating that the UE is requesting that a signaling connection with the UE be maintained. In step 1002 the AMF receives a registration request from a UE. In step 1004 the AMF determines whether the registration request message includes information (e.g., a follow-on flag) indicating that the UE is requesting that a signaling connection with the UE be maintained. Furthermore, the AMF as shown in step 1006 may store information that the UE has requested the signaling connection is to be maintained and the AMF may send to a node of a serving RAN information indicating that the UE has requested that the signaling connection be maintained. In step 1008 the node of the RAN may increase an inactivity timer for the UE as a result of receiving the information sent by the AMF. The node of the RAN may enable AS security to enable connected mode mobility for the UE as shown in step 1010.

Figure 11:
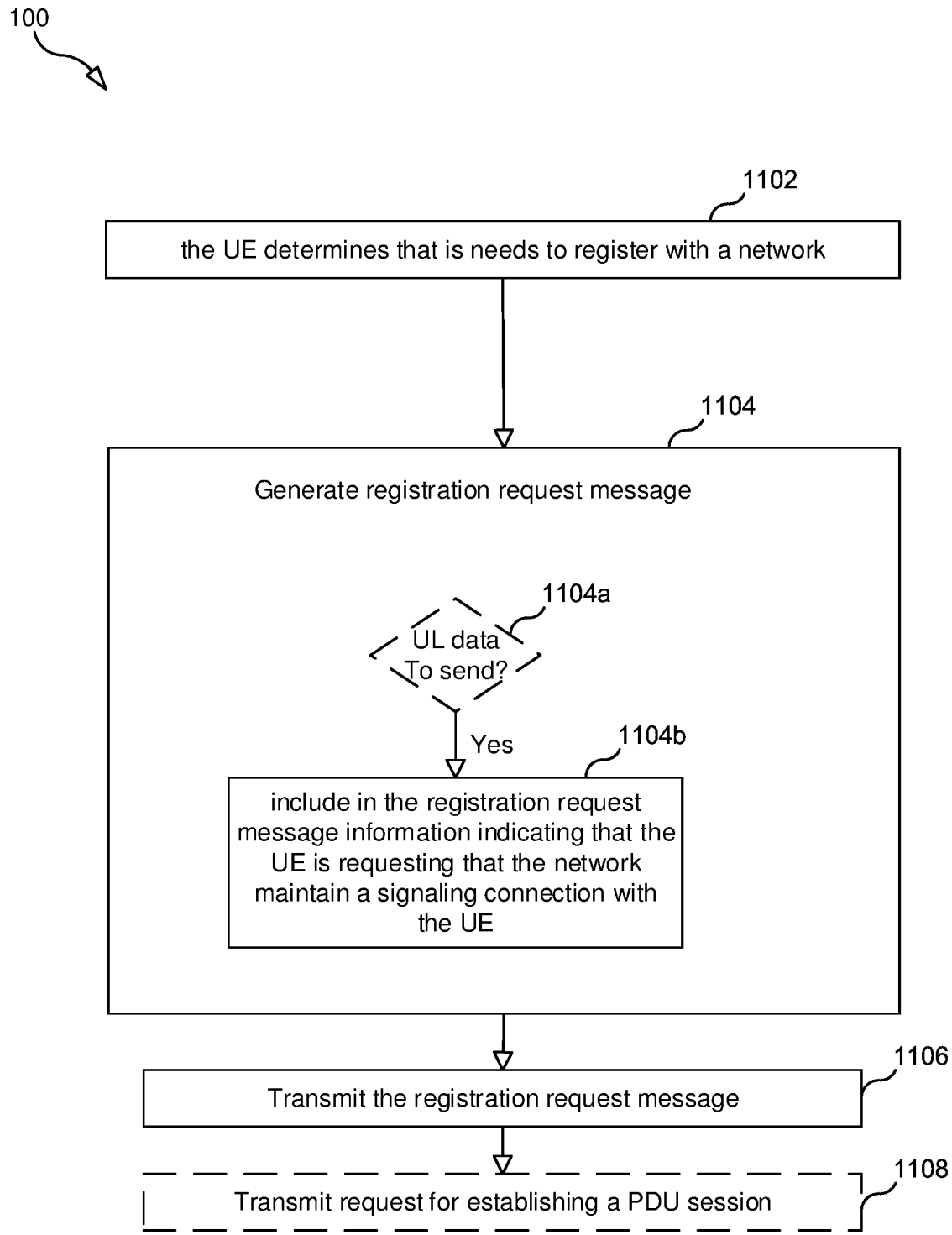
FIG. 11 is a flow chart illustrating a process according to one embodiment.

FIG. 11 is a flow chart illustrating a process 1100 according to some embodiments. Process 1100 includes: the UE (102) determining that the UE needs to register with a network (1102); and the UE, as a result of determining that the UE needs to register with the network, generating a registration request message (1104) and transmitting the registration request message to the network (1106), wherein generating the registration request message comprises including in the registration request message information (e.g., a follow-on flag) indicating that the UE is requesting that the network maintain a signaling connection with the UE (1104b).

Figure 5:
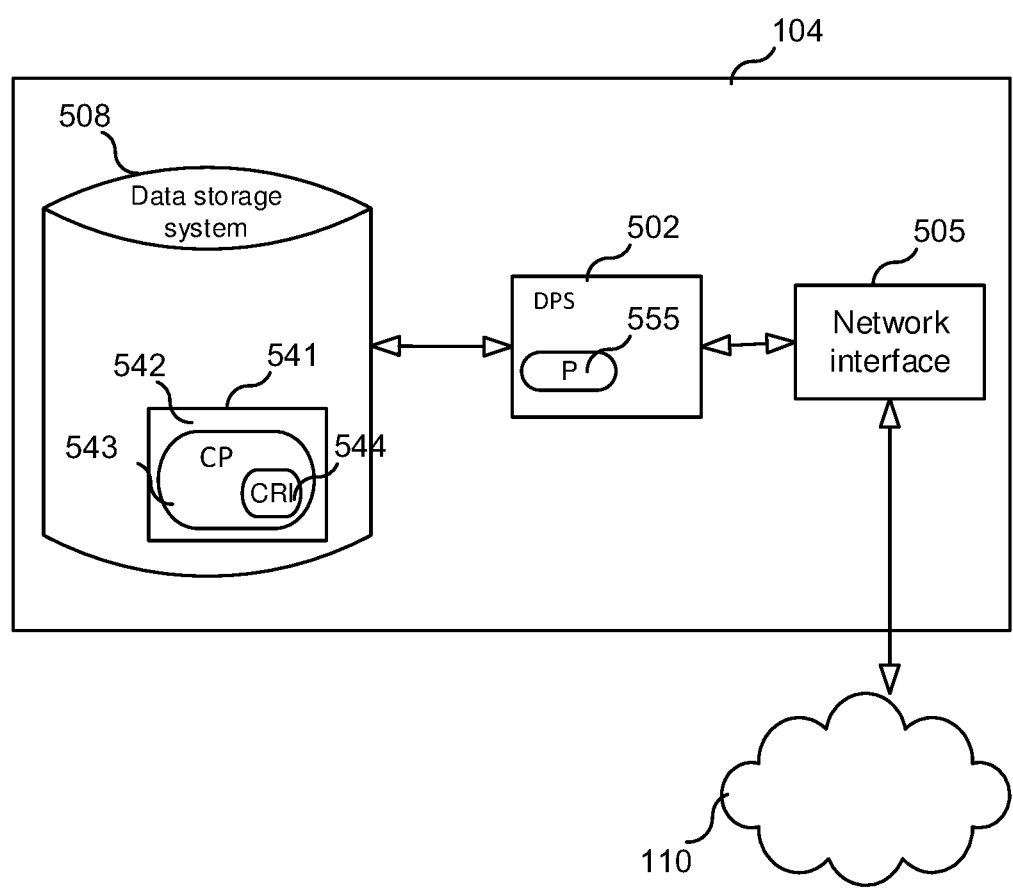
FIG. 5 is a block diagram of an AMF according to some embodiments.

FIG. 5 is a block diagram of AMF 104 according to some embodiments. As shown in FIG. 5, the AMF 104 may comprise: a data processing system (DPS) 502, which may include one or more processors 555 (e.g., a general purpose microprocessor and/or one or more other processors, such as an application specific integrated circuit (ASIC), field-programmable gate arrays (FPGAs), and the like); network interface 505 for use in connecting AMF 104 to a network 110 such that AMF 104 can communicate with the other described functions (e.g., SMF 106) and RAN 108; and local storage unit (a.k.a., "data storage system") 508, which may include one or more non-volatile storage devices and/or one or more volatile storage devices (e.g., random access memory (RAM)). In embodiments where the AMF 104 includes a general purpose microprocessor, a computer program product (CPP) 541 may be provided. CPP 541 includes a computer readable medium (CRM) 542 storing a computer program (CP) 543 comprising computer readable instructions (CRI) 544. CRM 542 may be a non-transitory computer readable medium, such as, but not limited, to magnetic media (e.g., a hard disk), optical media (e.g., a DVD), memory devices (e.g., random access memory), and the like. In some embodiments, the CRI 544 of computer program 543 is configured such that when executed by data processing system 502, the CRI causes the AMF 104 to perform steps described above (e.g., steps described above with reference to the flow charts). In other embodiments, the AMF 104 may be configured to perform steps described herein without the need for code. That is, for example, data processing system 502 may consist merely of one or more ASICs. Hence, the features of the embodiments described herein may be implemented in hardware and/or software.

Figure 6:
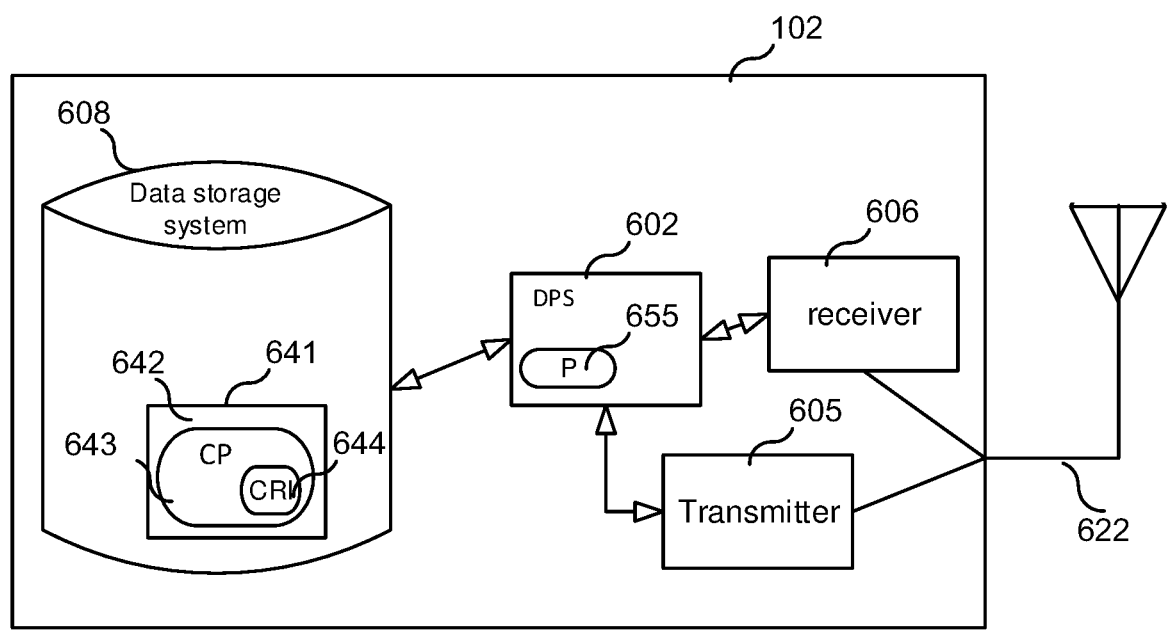
FIG. 6 is a block diagram of a UE according to some embodiments.

FIG. 6 is a block diagram of a UE 102 according to some embodiments. As shown in FIG. 6, UE 102 may comprise: a data processing system (DPS) 602, which may include one or more processors 655 (e.g., a general purpose microprocessor and/or one or more other processors, such as an application specific integrated circuit (ASIC), field-programmable gate arrays (FPGAs), and the like); a radio transmitter 605 and a radio receiver 606 coupled to an antenna 622 for use in wirelessly communicating with a radio access network (RAN) node (e.g., a Tx/Rx Point (TRP)); and local storage unit (a.k.a., "data storage system") 608, which may include one or more non-volatile storage devices and/or one or more volatile storage devices (e.g., random access memory (RAM)). In embodiments where UE 102 includes a general-purpose microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited, to magnetic media (e.g., a hard disk), optical media (e.g., a DVD), memory devices (e.g., random access memory), and the like. In some embodiments, the CRI 644 of computer program 643 is configured such that when executed by data processing system 602, the CRI causes UE 102 to perform steps described above (e.g., steps described above with reference to the flow charts). In other embodiments, UE 102 may be configured to perform steps described herein without the need for code. That is, for example, data processing system 602 may consist merely of one or more ASICs. Hence, the features of the embodiments described herein may be implemented in hardware and/or software.

Figure 7:
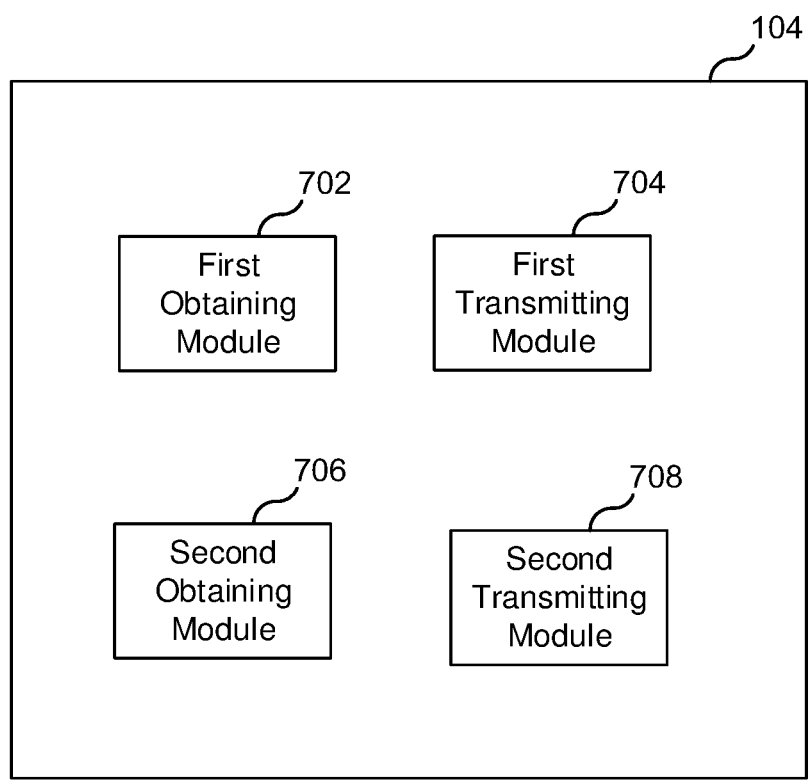
FIG. 7 is a diagram showing functional modules of an AMF according to some embodiments.

FIG. 7 is a diagram showing functional modules of an AMF 104 according to some embodiments. As shown in the embodiment of FIG. 7, the AMF 104 comprises a number of functional modules, including: a first obtaining module 702 configured to obtain via a receiver a registration request message transmitted by the UE 102, wherein the registration request message comprises information identifying a PDU session that requires UP resources; a first transmitting module 704 configured to configured to employ a transmitter to transmit to a SMF 106 a UP resource request message for requesting the SMF 106 to establish UP resources for the identified PDU session in response to receiving the registration request message; a second obtaining module 706 configured to obtain via the receiver session management information (e.g., N2 SM information) transmitted by the SMF 106 in response to the UP resource request message; and a second transmitting module 708 configured to employ a transmitter to transmit to an access node 108 serving the UE 102 a message (e.g., N2 PDU Session Request), wherein the message includes the session management information (e.g., N2 SM information). It should be understood that the modules 702-708 in one embodiment may be enabled through software instructions and in another embodiment through hardware, such as ASICs and DSPs, and in further embodiments through a mix of hardware and software.

Figure 8:
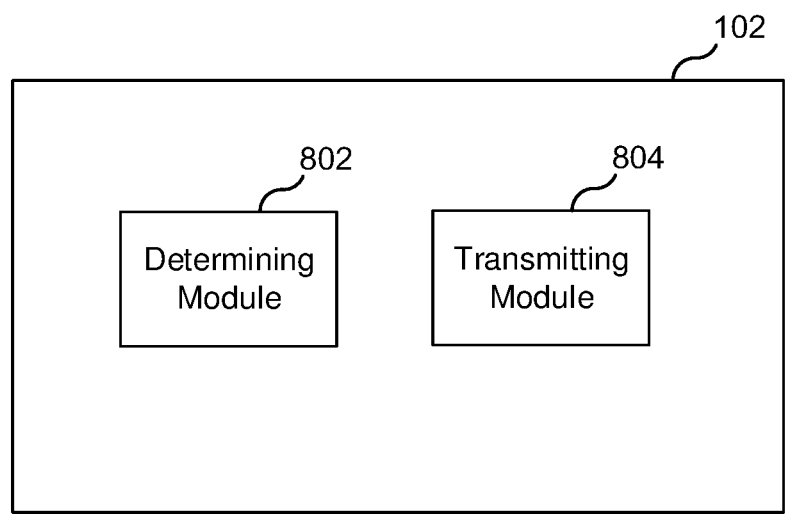
FIG. 8 is a diagram showing functional modules of a UE according to some embodiments.

FIG. 8 is a diagram showing functional modules of a UE 102 according to some embodiments. As shown in the embodiment of FIG. 8, The UE 102 comprises a number of functional modules, including: a determining module 802 configured to determine a first PDU session that requires UP resources; and a first transmitting module 804 configured to employ a transmitter to transmit a registration request message, wherein the registration request message comprises information identifying the first PDU session that requires the UP resources. It should be understood that the modules 802-804 in one embodiment may be enabled through software instructions and in another embodiment through hardware, such as ASICs and DSPs, and in further embodiments through a mix of hardware and software.

Concise Description of various disclosed embodiments:

AMF Embodiments

A1. A method (300) for PDU session management, the method (300) comprising:
receiving (302), at an AMF (104), a registration request message transmitted by a user equipment, UE (102), wherein the registration request message comprises information indicating that one or more PDU sessions require user plane, UP, resources and identifying each of the PDU sessions that require UP resources; and
in response to receiving the registration request message, the AMF (104) transmitting (304) to a session management function, SMF (106), a UP resource request message for requesting the SMF (106) to establish UP resources for at least one of the PDU sessions that requires UP resources.

A2. The method (300) of embodiment A1, the method further comprising:
in response to receiving the UP resource request message, the SMF (106) triggers a UP function relocation.

A3. The method (300) of embodiment A1 or A2, wherein the registration request message further comprises a registration type identifier (ID) indicating that the UE (102) is in a registered state and is initiating a registration due to mobility.

A4. The method (300) of any one of the above embodiments, wherein the method further comprises:
receiving session management, SM, information (e.g., N2 SM information) transmitted by the SMF (106) in response to the UP resource request message.

A5. The method (300) of embodiment A4, wherein the method further comprises:
the AMF (104) transmitting to an access node (108) serving the UE (102) a message (e.g., N2 PDU Session Request), wherein the message includes the session management information (e.g., N2 SM information).

A6. The method (300) of embodiments A4 or A5, wherein the session management information (e.g., N2 SM information) comprises information indicating a quality of service (QoS) and tunnel endpoint information.

A7. The method of any one of the above embodiments, wherein the UP resources for an identified PDU session that requires UP resources include data radio bearers, DRBs, on a radio interface and a UP tunnel between a UP function and the access node (108) serving the UE (102).

B1. An AMF (104) for PDU session management, the AMF (104) adapted to:
receive (304) a registration request message transmitted by a user equipment, UE (102), wherein the registration request message comprises information indicating that one or more PDU sessions require user plane, UP, resources and identifying each of the PDU sessions that require UP resources; and
in response to receiving the registration request message, transmit (304) to a session management function, SMF (106), a UP resource request message for requesting the SMF (106) to establish UP resources for at least one of the identified PDU sessions that requires UP resources.

C1. An AMF (104) for PDU session management, the AMF (104) comprising:
a first obtaining module (702) configured to obtain via a receiver a registration request message transmitted by a user equipment, UE (102), wherein the registration request message comprises information indicating that one or more PDU sessions require user plane, UP, resources and identifying each of the PDU sessions that require UP resources; and
a first transmitting module (704) configured to employ a transmitter to transmit to a session management function, SMF (106), a UP resource request message as a result of receiving the registration request message, wherein the UP resource request message comprises information for requesting the SMF (106) to establish UP resources for at least one of the identified PDU sessions that requires UP resources.

B/C2. The AMF (104) of embodiment B1 or C1, wherein the registration request message further comprises a registration type identifier (ID) indicating that the UE (102) is in a registered state and is initiating a registration due to mobility.

B/C3. The AMF (104) of any one of the above embodiments, wherein the AMF (104) is further adapted to receive session management information (e.g., N2 SM information) transmitted by the SMF (106) in response to the UP resource request message;

or the AMF (104) further comprises a second obtaining module (706) configured to obtain via the receiver session management information (e.g., N2 SM information) transmitted by the SMF (106) in response to the UP resource request message.

B/C4. The AMF (104) of embodiment B/C3, wherein the AMF (104) is further adapted to transmit to an access node (108) serving the UE (102) a message (e.g., N2 PDU Session Request), wherein the message includes the session management information (e.g., N2 SM information); or the AMF (104) further comprises a second transmitting module (708) configured to employ a transmitter to transmit to an access node (108) serving the UE (102) a message (e.g., N2 PDU Session Request), wherein the message includes the session management information (e.g., N2 SM information).

B/C5. The AMF (104) of embodiments B/C4 or B/C5, wherein the session management information (e.g., N2 SM information) comprises information indicating a quality of service (QoS) and tunnel endpoint information.

B/C6. The AMF (104) of any one of the above embodiments, wherein the UP resources for the identified PDU session include data radio bearers, DRBs, on a radio interface and a UP tunnel between a UP function and the access node (108) serving the UE (102).

UE Embodiments

D1. A method (400) for PDU session management, the method (400) comprising:
determining (402), by a user equipment, UE (102), that a first PDU session requires user plane, UP, resources;
determining (404), by the UE, that a registration request message needs to be transmitted; and
after determining that a) the registration request message needs to be transmitted and b) the first PDU session requires UP resources, the UE transmitting (404) the registration request message, wherein the registration request message comprises information indicating that the first PDU session requires UP resources.

D2. The method (400) of embodiment D1, wherein the registration request message further comprises a registration type identifier, ID, for identifying a registration type, a UE ID (e.g., a Permanent ID or a Temporary ID), security parameters, network slice selection assistance information, NSSAI.

D3. The method (400) of embodiment D1 or D2, wherein the registration request message further comprises a registration type identifier indicating that the UE (102) is in a registered state and is initiating a registration due to mobility.

D4. The method (400) of any one of the above embodiments, wherein the UP resources for the identified PDU session include data radio bearers, DRBs, on a radio interface and an UP tunnel.

E1. A user equipment, UE (102), for PDU session management, the UE (102) adapted to:
determine that a first PDU session requires user plane, UP, resources;
determine that registration request message needs to be transmitted; and
after determining that a) the registration request message needs to be transmitted and b) the first PDU session requires UP resources, transmit the registration request message, wherein the registration request message comprises information indicating that the first PDU session requires UP resources.

F1. A user equipment, UE (102), for PDU session management, the UE (102) comprising:
a determining module (802) configured to determine: i) whether a first PDU session requires user plane, UP, resources and ii) whether a registration request message needs to be transmitted; and
a first transmitting module (804) configured to employ a transmitter to transmit the registration request message in response to the determining module determining that the registration message needs to be transmitted, wherein the registration request message comprises information identifying that the first PDU session that requires the UP resources.

E/F2. The UE (102) of embodiment E1 or F1, wherein the registration request message further comprises a registration type identifier (ID) for identifying a registration type, a UE ID (e.g., a Permanent ID or a Temporary ID), security parameters, network slice selection assistance information (NSSAI).

E/F3. The UE (102) of embodiment E1, F1 or E/F2, wherein the registration request message further comprises a registration type identifier (ID) indicating that the UE (102) is in a registered state and is initiating a registration due to mobility.

E/F4. The UE (102) of any one of the above embodiments, wherein the UP resources for the identified PDU session include data radio bearers, DRBs, on a radio interface and a UP tunnel.

G1. A method (900), comprising:
a UE (102) determining whether the UE has moved into a new registration area (step 902); and
as a result of determining that the UE has moved into a new registration area, the UE generating a registration request message (904) and transmitting the registration request message (906), wherein the step of generating the registration request message comprise:
the UE determining whether the UE has uplink (UL) data to send (904*a*) and, if that is the case, the UE includes in the registration request message information i) indicating that a PDU session requires UP resources and ii) identifying said PDU session (904*b*).

Additional AMF Embodiments

H1. A method (1000), comprising:
an AMF (104) receiving a registration request message transmitted by a UE (102); and the AMF (104) determining whether the registration request message includes information (e.g., a follow-on flag) indicating that the UE is requesting that a signaling connection with the UE be maintained.

H2. The method of embodiment HI, further comprising:
as a result of the AMF determining that the registration request message includes information indicating that the UE is requesting that the signaling connection with the UE be maintained, the AMF storing information (e.g., a local flag) indicating that the UE has requested that the signaling connection be maintained.

H3. The method of embodiment H1 or H2, further comprising:
as a result of the AMF determining that the registration request message includes information indicating that the UE is requesting that the signaling connection with the UE be maintained, the AMF sending information to a node (e.g., base station) of a radio access network (RAN) that is serving the UE, wherein the information sent to the node indicates that the UE has requested that the signaling connection be maintained.

H4. The method of embodiment H3, wherein the node of the RAN increases an inactivity timer for the UE as a result of receiving the information sent by the AMF.

H5. The method of any one of embodiments H3-H4, wherein the information sent by the AMF to the node of the RAN further comprises information for enabling Access Stratus (AS) security (e.g. to enable connected mode mobility).

H6. The method of embodiment H5, further comprising the node of the RAN enabling AS security to enable connected mode mobility for the UE.

I. An apparatus adapted to:
receive a registration request message transmitted by a UE (102); and
determine whether the received registration request message includes information (e.g., a follow-on flag) indicating that the UE is requesting that a signaling connection with the UE be maintained.

J. An apparatus comprising:
an obtaining module for obtaining a registration request message transmitted by a UE (102); and
a determining module for determining whether the obtained registration request message includes information (e.g., a follow-on flag) indicating that the UE is requesting that a signaling connection with the UE be maintained.

Additional UE Embodiments

H1. A method (1100), comprising:
a UE (102) determining that the UE needs to register with a network (1102);
the UE, as a result of determining that the UE needs to register with the network, generating a registration request message (1104) and transmitting the registration request message to the network (1106), wherein
generating the registration request message comprises including in the registration request message information (e.g., a follow-on flag) indicating that the UE is requesting that the network maintain a signaling connection with the UE (1104b).

H2. The method of embodiment H1, further comprising:
the UE determining whether the UE has uplink, UL, data to send (1104a), wherein
the UE includes in the registration request message the information indicating that the UE is requesting that the network maintain the signaling connection with the UE as a result of the UE determining that the UE has UL data to send.

H3. The method of embodiment H1 or H2, further comprising:
the UE transmitting a request to establish a PDU session (1108) (in some embodiments, the UE transmits the request to establish the PDU session immediately after the UE is successfully registered with the network).

I1. A UE (102) adapted to:
determine that the UE needs to register with a network (1102);
as a result of determining that the UE needs to register with the network, generate a registration request message (1104) and transmit the registration request message to the network (1106), wherein
the UE is configured to generate the registration request message by performing a process comprising including in the registration request message information (e.g., a follow-on flag) indicating that the UE is requesting that the network maintain a signaling connection with the UE (1104b).

J1. A UE (102) comprising:
a determining module for determining whether the UE needs to register with a network;
a generating module for generating a registration request message as a result of determining that the UE needs to register with the network;
a transmitting module for employing a transmitter to transmit the registration request message to the network, wherein
the generating module is configured to generate the registration request message by performing a process comprising including in the registration request message information (e.g., a follow-on flag) indicating that the UE is requesting that the network maintain a signaling connection with the UE.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for protocol data unit (PDU) session management, the method comprising:
receiving, at an Access and Mobility Management function entity (AMF) a registration request message transmitted by a user equipment (UE), wherein the registration request message comprises a list of PDU sessions to be activated; and
in response to receiving the registration request message, the AMF transmitting to a session management function (SMF) a request message for requesting the SMF to activate UP resources for at least one of the PDU sessions identified in the list of PDU sessions.

2. The method of claim 1, the method further comprising:
in response to receiving the UP resource request message, the SMF triggers a UP function relocation.

3. The method of claim 1, wherein the registration request message further comprises a registration type identifier (ID) indicating that the UE is in a registered state and is initiating a registration due to mobility.

4. The method of claim 1, wherein the method further comprises:
receiving session management (SM) information transmitted by the SMF in response to the UP resource request message, wherein the SM information comprises N2 SM information that the AMF should provide to an access network node serving the UE.

5. The method of claim 4, wherein the method further comprises:
the AMF transmitting to the access network node serving the UE an N2 Request message, wherein the N2 Request message includes the N2 SM information that the SMF transmitted to the AMF in response to the request message from the AMF requesting the SMF to activate the UP resources.

6. The method of claim 4, wherein the N2 SM information comprises quality of service (QoS) information and tunnel information.

7. The method of claim 1, wherein the UP resources include data radio bearers on a radio interface and a UP tunnel between a UP function and the access network node serving the UE.

8. The method of claim 1, wherein the registration request message comprises a follow-on flag indicating that the UE is requesting that the network maintain a signaling connection with the UE.

9. The method of claim 8, further comprising:
the AMF storing information indicating that the UE has requested that the signaling connection be maintained; and
the AMF sending information to a node of a radio access network that is serving the UE, wherein the information sent to the node indicates that the UE has requested that the signaling connection be maintained.

10. An Access and Mobility Management Function (AMF) for protocol data unit (PDU) session management, the AMF comprising:
a data processing system;
a data storage system; and
a network interface, wherein the AMF is configured to:
receive via the network interface a registration request message transmitted by a user equipment, UE, wherein the registration request message comprises a list of PDU sessions to be activated; and
in response to receiving the registration request message, transmit via the network interface to a session management function (SMF) a UP resource request message for requesting the SMF to activate UP resources for at least one of the identified PDU sessions identified in the list of PDU sessions.

11. The AMF of claim 10, wherein the registration request message further comprises a registration type identifier indicating that the UE is in a registered state and is initiating a registration due to mobility.

12. The AMF of claim 10, wherein the AMF is further adapted to receive session management information transmitted by the SMF in response to the UP resource request message, wherein the session management information is N2 SM information.

13. The AMF of claim 12, wherein
the AMF is further adapted to transmit to an access node serving the UE a message, N2 PDU Session Request, wherein the message includes the session management information.

14. The AMF of claim 12, wherein the session management information comprises information indicating a quality of service (QoS) and tunnel endpoint information.

15. The AMF of claim 10, wherein the UP resources for the identified PDU session include data radio bearers (DRBs) on a radio interface and a UP tunnel between a UP function and the access node serving the UE.

16. The AMF of claim 10, wherein the registration request message comprises a follow-on flag indicating that the UE is requesting that the network maintain a signaling connection with the UE.

17. A method for protocol data unit (PDU) session management, the method comprising:
determining, by a user equipment (UE) that one or more PDU sessions require user plane (UP) resources;
determining, by the UE, that a registration request message needs to be transmitted; and
after determining that a) the registration request message needs to be transmitted and b) the one or more PDU sessions require UP resources, the UE transmitting the registration request message, wherein the registration request message comprises a list of PDU sessions to be activated.

18. The method of claim 17, wherein the registration request message further comprises a registration type identifier (ID) for identifying a registration type, a UE ID, security parameters, network slice selection assistance information, and Network Slice Selection Assistance Information.

19. The method of claim 17, wherein the registration request message further comprises a registration type identifier indicating that the UE is in a registered state and is initiating a registration due to mobility.

20. The method of claim 17, wherein the UP resources for the identified PDU session include data radio bearers on a radio interface and an UP tunnel.

21. The method of claim 17, wherein the registration request message comprises a follow-on flag indicating that the UE is requesting that the network maintain a signaling connection with the UE.

22. A user equipment (UE), the UE comprising:
a data processing system;
a data storage system;
a transmitter coupled to an antenna; and
a receiver coupled to the antenna, wherein the UE is configured to:
determine that a one or more protocol data unit (PDU) sessions require user plane (UP) resources;
determine that a registration request message needs to be transmitted using the transmitter; and
after determining that a) the registration request message needs to be transmitted and b) the one or more PDU session require UP resources, transmit using the transmitter the registration request message, wherein the registration request message comprises a list of PDU sessions to be activated.

23. The UE of claim 22, wherein the registration request message further comprises a registration type identifier (ID) for identifying a registration type, a UE ID, a Permanent ID or a Temporary ID, security parameters, network slice selection assistance information.

24. The UE of claim 22, wherein the registration request message further comprises a registration type identifier, ID, indicating that the UE is in a registered state and is initiating a registration due to mobility.

25. The UE of claim 22, wherein the UP resources for the identified PDU session include data radio bearers on a radio interface and a UP tunnel.

26. The UE of claim 22, wherein the registration request message further comprises a follow-on flag indicating that the UE is requesting that the network maintain a signaling connection with the UE.

27. The method of claim 1, wherein the registration request message further comprises a registration type identifier (ID) indicating that the UE is in a registered state and is initiating a registration due to an expiration of a timer.

* * * * *

UNITED STATES PATENT AND TRADEMARK OFFICE
CERTIFICATE OF CORRECTION

PATENT NO. : 11,412,473 B2  
APPLICATION NO. : 15/744238  
DATED : August 9, 2022  
INVENTOR(S) : Schliwa-Bertling et al.

Page 1 of 1

It is certified that error appears in the above-identified patent and that said Letters Patent is hereby corrected as shown below:

On the Title Page

In Item (57), under "ABSTRACT", in Column 2, Lines 7-8, delete "Access and Mobility Management function entity, AMF," and insert -- Access and Mobility Management function, AMF, entity --, therefor at each occurrence throughout the patent.

Signed and Sealed this  
Seventh Day of February, 2023

Katherine Kelly Vidal  
*Director of the United States Patent and Trademark Office*